United States Patent
Park et al.

(10) Patent No.: US 10,147,959 B2
(45) Date of Patent: Dec. 4, 2018

(54) METHOD FOR GENERATING INJECTION CURRENT FOR FUEL CELL STACK AND APPARATUS FOR PERFORMING THE SAME

(71) Applicant: HYUNDAI AUTRON CO., LTD., Seongnam-si (KR)

(72) Inventors: Hyun-Seok Park, Gunpo-si (KR); Mun-Ki Ko, Yongin-si (KR); Jin-Ho Cho, Yongin-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 727 days.

(21) Appl. No.: 14/564,600

(22) Filed: Dec. 9, 2014

(65) Prior Publication Data

US 2015/0180365 A1 Jun. 25, 2015

(30) Foreign Application Priority Data

Dec. 20, 2013 (KR) .................. 10-2013-0159877

(51) Int. Cl.
*H01M 8/04664* (2016.01)
*H01M 8/04537* (2016.01)
(Continued)

(52) U.S. Cl.
CPC ......... *H01M 8/04679* (2013.01); *B60L 1/003* (2013.01); *B60L 3/0053* (2013.01); *B60L 3/12* (2013.01); *B60L 11/005* (2013.01); *B60L 11/1803* (2013.01); *B60L 11/1868* (2013.01); *B60L 11/1883* (2013.01); *B60L 11/1898* (2013.01); *H01M 8/04559* (2013.01); *H01M 8/04589* (2013.01); *H02J 7/34* (2013.01); *B60L 2210/12* (2013.01); *B60L 2210/14* (2013.01); *B60L 2240/529* (2013.01);
(Continued)

(58) Field of Classification Search
CPC ......... H01M 8/04589; H01M 8/04679; H01M 8/0491
USPC .................................. 320/103; 429/429–432
See application file for complete search history.

(56) References Cited

U.S. PATENT DOCUMENTS

2006/0074574 A1  4/2006  Gasda et al.
2009/0061263 A1  3/2009  Watanabe
(Continued)

FOREIGN PATENT DOCUMENTS

CN  1758066 A  4/2006
CN  101578193 A  11/2009
(Continued)

*Primary Examiner* — Richard Isla
*Assistant Examiner* — Manuel Hernandez
(74) *Attorney, Agent, or Firm* — Morgan, Lewis & Bockius LLP

(57) ABSTRACT

An apparatus for generating injection current for a fuel cell stack includes a first converter configured to convert direct current of a voltage corresponding to a high voltage battery, into direct current of a predetermined voltage; a second converter configured to convert the converted direct current into alternating current; a filter configured to filter a signal of a predetermined frequency band from the converted alternating current; and a control unit configured to perform a feedback control to allow the filtered alternating current to be injected without being distorted when injecting the filtered alternating current into the fuel cell stack.

18 Claims, 4 Drawing Sheets

(51) Int. Cl.
*B60L 1/00* (2006.01)
*B60L 3/00* (2006.01)
*B60L 3/12* (2006.01)
*B60L 11/00* (2006.01)
*B60L 11/18* (2006.01)
*H02J 7/34* (2006.01)
*H01M 8/04858* (2016.01)
*H02J 3/01* (2006.01)
*H02J 1/00* (2006.01)
*H02M 7/42* (2006.01)
*H01M 16/00* (2006.01)
*H02J 3/00* (2006.01)

(52) U.S. Cl.
CPC ........ *H01M 8/0488* (2013.01); *H01M 8/0491* (2013.01); *H01M 16/003* (2013.01); *H01M 2250/20* (2013.01); *H02J 3/01* (2013.01); *H02J 2001/004* (2013.01); *H02J 2003/002* (2013.01); *H02M 7/42* (2013.01); *Y02E 40/40* (2013.01); *Y02T 10/7022* (2013.01); *Y02T 10/7066* (2013.01); *Y02T 10/7225* (2013.01); *Y02T 10/7233* (2013.01); *Y02T 90/32* (2013.01); *Y02T 90/34* (2013.01); *Y10T 307/406* (2015.04)

(56) References Cited

U.S. PATENT DOCUMENTS

| | | | |
|---|---|---|---|
| 2009/0226770 A1* | 9/2009 | Manabe | H01M 8/04567 429/431 |
| 2010/0127710 A1* | 5/2010 | Hasegawa | H01M 8/04544 324/433 |
| 2012/0053766 A1 | 3/2012 | Ham et al. | |
| 2015/0180057 A1* | 6/2015 | Park | H01M 8/0491 429/431 |
| 2015/0180348 A1* | 6/2015 | Park | H01M 8/04559 307/63 |

FOREIGN PATENT DOCUMENTS

| | | |
|---|---|---|
| DE | 102 20 172 A1 | 11/2003 |
| DE | 10 2010 005 736 A1 | 9/2010 |
| DE | 10 2011 005 966 A1 | 9/2012 |
| DE | 11 2009 004 773 T5 | 10/2012 |
| DE | 11 2012 001 623 T5 | 1/2014 |
| EP | 1 646 101 A2 | 4/2006 |
| JP | 2010-32490 A | 2/2010 |
| KR | 10-2010-0051511 A | 5/2010 |
| KR | 10-1246353 B1 | 3/2013 |
| KR | 10-1519271 B1 | 5/2015 |

* cited by examiner

METHOD FOR GENERATING INJECTION CURRENT FOR FUEL CELL STACK AND APPARATUS FOR PERFORMING THE SAME

CROSS REFERENCE TO RELATED APPLICATION

This application claims the benefit of Korean Patent Application No. 10-2013-0159877, filed on Dec. 20, 2013, entitled "METHOD FOR GENERATING INJECTION CURRENT FOR FUEL CELL STACK AND APPARATUS FOR PERFORMING THE SAME", which is hereby incorporated by reference in its entirety into this application.

BACKGROUND

1. Technical Field

The present disclosure relates to a method for generating injection current for a fuel cell stack and an apparatus for performing the same.

2. Related Art

A fuel cell is a kind of a power generating device which does not convert the chemical energy of a fuel into heat by combustion but converts the chemical energy into electrical energy by an electrochemical reaction in a stack, and may be used to not only supply industrial power, home power and vehicle driving power but also supply power to a small electric/electronic product, particularly, a portable device.

As a power supply source for driving a vehicle, a polymer electrolyte membrane fuel cell (PEMFC) (a proton exchange membrane fuel cell) having the highest power density among fuel cells has been currently studied mainly. The polymer electrolyte membrane fuel cell has a rapid start time and a rapid power converting reaction time due to a low operation temperature.

The polymer electrolyte membrane fuel cell is configured to include a membrane electrode assembly (MEA) in which catalyst electrode layers in which electrochemical reactions occur are attached to both sides of a solid polymer electrolyte membrane through which hydrogen ions pass, gas diffusion layers (GDL) which serve to uniformly distribute reaction gases and transfer generated electrical energy, gaskets and coupling mechanisms which maintain airtightness of the reaction gases and a coolant and an appropriate coupling pressure, and bipolar plates which move the reaction gases and the coolant.

When a fuel cell stack is assembled using the configuration of a unit cell as described above, the combination of the membrane electrode assembly and the gas diffusion layers, which are main parts, is positioned in the innermost portion of the cell. The membrane electrode assembly has the catalyst electrode layers applied with catalysts to allow hydrogen and oxygen to react with each other, that is, an anode and a cathode, on both surfaces of the polymer electrolyte membrane, and the gas diffusion layers, the gaskets, and so forth are stacked on the outer sides of the anode and the cathode.

The bipolar plates formed with flow fields, through which the reaction gases (hydrogen as a fuel and oxygen or air as an oxidizer) are supplied and the coolant passes, are positioned on the outer sides of the gas diffusion layers. After a plurality of unit cells each having the above-mentioned configuration are stacked, current collectors, insulating plates, and end plates for supporting the stacked cells are coupled to outermost portions. The fuel cell stack is configured by repeatedly stacking and coupling the unit cells between the end plates.

In order to obtain the potential actually required in a vehicle, unit cells should be stacked to correspond to the required potential, and the structure formed by stacking the unit cells is referred to as a stack. The potential generated by one unit cell is about 1.3V. Therefore, in order to generate the power required for driving a vehicle, a plurality of cells are stacked in series.

SUMMARY

Various embodiments are directed to a method for generating injection current for a fuel cell stack and an apparatus for performing the same, in which a high voltage battery is used instead of a general battery for a vehicle such that it is sufficient to boost only several tens of volts when boosting the direct current of a voltage corresponding to the high voltage battery, whereby it is possible to decrease a transformation ratio, and thus reduce the cost of parts and decrease the volume of a circuit.

Also, various embodiments are directed to a method for generating injection current for a fuel cell stack and an apparatus for performing the same, in which a fault of a fuel cell stack may be diagnosed by measuring the voltage of the fuel cell stack even before the fuel cell stack generates power, because a high voltage battery always retains a power-on state even though a vehicle is changed to an off state.

Objects to be solved by the present invention are not limited to the above-mentioned objects, and other objects that are not mentioned may be clearly understood by those skilled in the art in the following description.

In an embodiment, an apparatus for generating injection current for a fuel cell stack may include: a first converter configured to convert direct current of a voltage corresponding to a high voltage battery, into direct current of a predetermined voltage; a second converter configured to convert the converted direct current into alternating current; a filter configured to filter a signal of a predetermined frequency band from the converted alternating current; and a control unit configured to perform a feedback control to allow the filtered alternating current to be injected without being distorted when injecting the filtered alternating current into the fuel cell stack.

The apparatus may further include a current sensor configured to provide actual alternating current injected into the fuel cell stack, to the control unit.

The control unit may check a difference between the actual alternating current received from the current sensor and injection alternating current.

The control unit may control an amplitude of the injection alternating current when the difference occurs between the actual alternating current and the injection alternating current as a result of checking.

The control unit may increase the amplitude of the injection alternating current when a value of the actual alternating current is smaller than a value of the injection alternating current.

The control unit may decrease the amplitude of the injection alternating current when a value of the actual alternating current is larger than a value of the injection alternating current.

The high voltage battery may be connected in parallel to the fuel cell stack.

The apparatus may further include a bidirectional converter configured to convert the voltage of the high voltage battery and provide a converted voltage to the fuel cell stack, and convert a voltage of the fuel cell stack and provide a converted voltage to the high voltage battery.

The first converter may boost the direct current of the voltage corresponding to the high voltage battery, into a voltage larger than the voltage of the fuel cell stack.

The second converter may convert the converted direct current into the alternating current by controlling a pulse width of the converted direct current.

The filter may generate the alternating current in the form of a sine wave, by passing a region of the converted alternating current corresponding to a low frequency and blocking a region of the converted alternating current corresponding to a high frequency.

In an embodiment, a method for generating injection current for a fuel cell stack, performed in an apparatus for generating injection current for a fuel cell stack, may include: converting direct current of a voltage corresponding to a high voltage battery, into direct current of a predetermined voltage; converting the converted direct current into alternating current; filtering a signal of a predetermined frequency band from the converted alternating current; and performing a feedback control to allow the filtered alternating current to be injected without being distorted when injecting the filtered alternating current into the fuel cell stack.

The method may further include receiving actual alternating current injected into the fuel cell stack.

The performing of the feedback control to allow the filtered alternating current to be injected without being distorted may include checking whether a difference occurs between injection alternating current injected into the fuel cell stack and the actual alternating current.

The checking of whether the difference occurs between the injection alternating current and the actual alternating current may include controlling an amplitude of the injection alternating current when the difference occurs between the injection alternating current and the actual alternating current as a result of checking.

The controlling of the amplitude of the injection alternating current may include increasing the amplitude of the injection alternating current when a value of the actual alternating current is smaller than a value of the injection alternating current.

The controlling of the amplitude of the injection alternating current may include decreasing the amplitude of the injection alternating current when a value of the actual alternating current is larger than a value of the injection alternating current.

The high voltage battery may be connected in parallel to the fuel cell stack.

The method may further include converting the voltage of the high voltage battery, and providing a converted voltage to the fuel cell stack; and converting a voltage of the fuel cell stack, and providing a converted voltage to the high voltage battery.

The converting of the direct current into the direct current of the predetermined voltage may include boosting the direct current of the voltage corresponding to the high voltage battery, into a voltage larger than the voltage of the fuel cell stack.

The converting of the converted direct current into the alternating current may include converting the converted direct current into the alternating current by controlling a pulse width of the converted direct current.

The filtering of the signal of the predetermined frequency band from the converted alternating current may include generating the alternating current in the form of a sine wave, by passing a region of the converted alternating current corresponding to a low frequency and blocking a region of the converted alternating current corresponding to a high frequency.

Specific matters of other exemplary embodiments will be included in a detailed description and the accompanying drawings.

Advantages and/or features of the present invention and methods to achieve them will be elucidated from exemplary embodiments described below in detail with reference to the accompanying drawings. However, the present invention is not limited to exemplary embodiment disclosed below, but will be implemented in various forms. The exemplary embodiments of the present invention make disclosure of the present invention thorough and are provided so that the scope of the present invention is fully conveyed to those skilled in the art. Therefore, the present invention will be defined by the scope of the appended claims. Like reference numerals denote like elements throughout the description.

DETAILED DESCRIPTION

A conventional apparatus for diagnosing a fault of a fuel cell stack determines whether a fault has occurred or not, by injecting alternating current into a fuel cell stack, detecting the voltage of the fuel cell stack, and calculating a total harmonic distortion (THD) using a result of analysis.

When sinusoidal alternating current is used by being added to operating current, the voltage of a normal cell is changed in a linear section, and the voltage of an abnormal cell is changed in a nonlinear section. The current of the fuel cell stack is the sum of the operating current and the sinusoidal alternating current.

When measuring the voltage of the fuel cell stack according to the current of the fuel cell stack, the voltage of the normal cell has a low THD according to a change in cell current, whereas the voltage of the abnormal cell has a large amplitude and a high THD according to a change in cell current.

The THD is measured as the sum of harmonic components versus the fundamental frequency of the injected alternating current. The conventional apparatus for diagnosing a fault of a fuel cell stack may determine whether a fault has occurred or not, by calculating the THD through frequency analysis of the voltage of the fuel cell stack and diagnosing the voltages of cells.

The conventional apparatus for diagnosing a fault of a fuel cell stack is configured by three main elements, i.e., the injection unit of the fuel cell stack, a unit for measuring the voltage of the fuel cell stack, and a fault diagnosing unit.

In order to diagnose a fault of a fuel cell stack by using a THD, alternating current is injected into the fuel cell stack.

In order to generate the alternating current, a process is performed in which the direct current of a voltage corresponding to a battery for a vehicle is boosted through a DC-DC converter. However, due to the use of the DC-DC converter, a problem may be caused in that parts cost a lot and the volume of a circuit increases.

In order to cope with this problem, embodiments of the present disclosure suggest a method for generating injection current for a fuel cell stack and an apparatus for performing the same, in which a high voltage battery is used instead of a general battery for a vehicle such that it is sufficient to boost only several tens of volts when boosting the direct current of a voltage corresponding to the high voltage battery, whereby it is possible to decrease a transformation ratio, and thus reduce the cost of parts and decrease the volume of a circuit.

Hereinafter, exemplary embodiments of the present invention will be described in detail with reference to the accompanying drawings.

Figure 1:
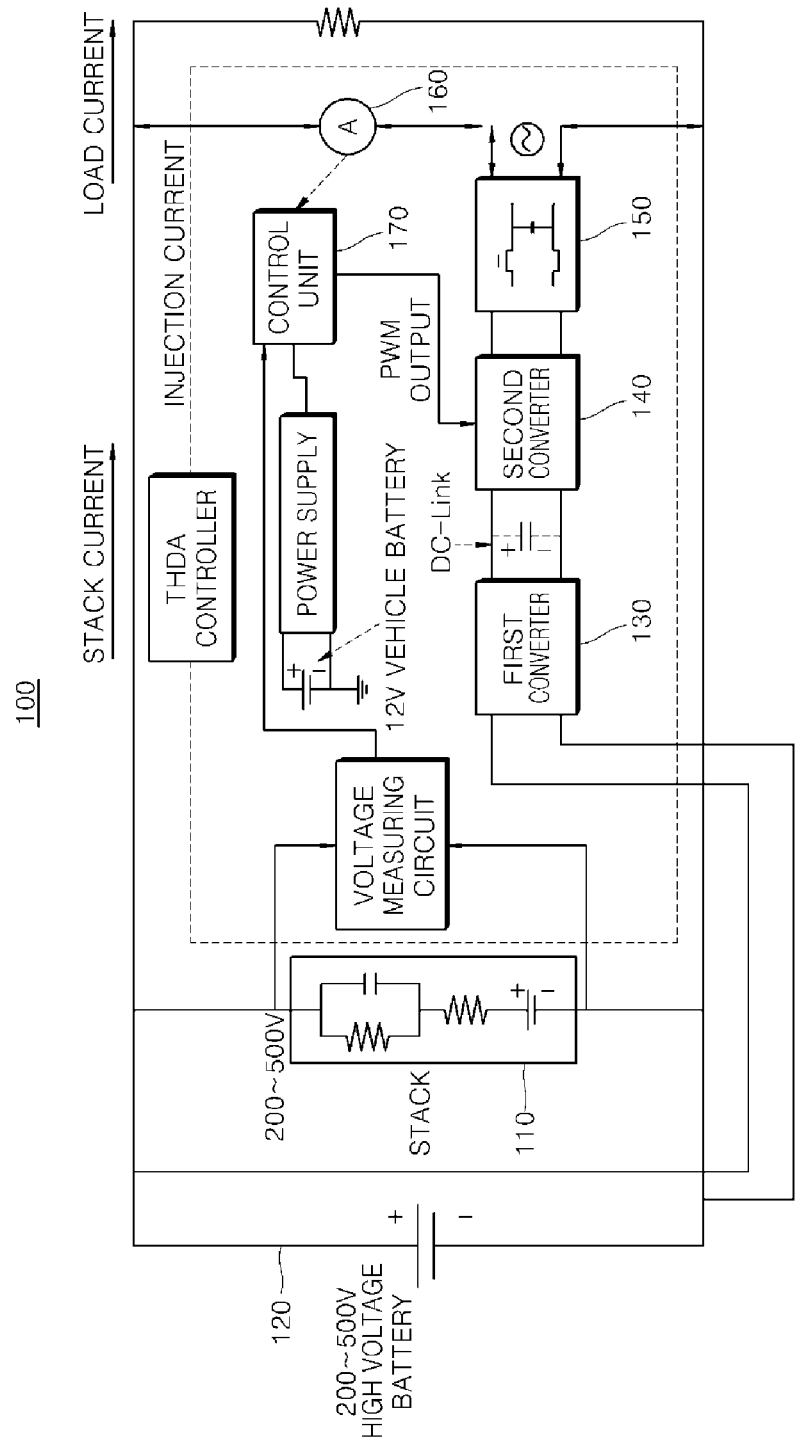
FIG. 1 is a block diagram of an apparatus for generating injection current for a fuel cell stack in accordance with an embodiment.

FIG. 1 is a block diagram of an apparatus for generating injection current for a fuel cell stack in accordance with an embodiment.

Referring to FIG. 1, an apparatus 100 for generating injection current for a fuel cell stack includes a fuel cell stack 110, a high voltage battery 120, a first converter 130, a second converter 140, a filter 150, a current sensor 160, and a control unit 170.

The fuel cell stack 110 is configured as a plurality of unit cells are continuously arranged. Such a fuel cell stack 110 generates direct current, and alternating current controlled by the control unit 170 may be injected into the fuel cell stack 110. That is to say, in order to prevent collision of the direct current generated from the fuel cell stack 110 and the alternating current injected into the fuel cell stack 110, the alternating current injected into the fuel cell stack 110 is controlled by the control unit 170 to become the same as the actual injection current fed back by the current sensor 160. Such a process will be described later in detail when explaining the control unit 170.

The voltage of the high voltage battery 120 may be set to be higher or lower than the voltage of the fuel cell stack 110. In the following descriptions, explanations will be made for the case where the voltage of the high voltage battery 120 is set to be lower than the voltage of the fuel cell stack 110.

In an embodiment, the high voltage battery 120 may be connected in parallel to the fuel cell stack 110. The reason why the high voltage battery 120 is connected in parallel to the fuel cell stack 110 resides in that, when a fuel cell stack generates electricity by the chemical reaction of hydrogen and oxygen, the power needed by a load may not be immediately generated under a peak load condition such a sudden acceleration and the like and thus a battery serving as an auxiliary power source plays the role of generating deficient power.

In an embodiment, the first converter 130 boosts the direct current of a voltage corresponding to the high voltage battery 120 to direct current of a predetermined voltage, and provides the direct current of the boosted predetermined voltage to the second converter 140.

The first converter 130 may boost the direct current of the voltage corresponding to the high voltage battery 120, to a voltage (for example, 550V to 600V) corresponding to the DC-Link of FIG. 1. Such a first converter 130 may be a boost type DC-DC converter. In other words, the first converter 130 may boost the direct current of the voltage corresponding to the high voltage battery 120, to a voltage higher than the voltage of the fuel cell stack 110.

Since it is sufficient for the first converter 130 to boost only several tens of bolts when boosting the direct current of the voltage corresponding to the high voltage battery 120, advantages are provided in that it is possible to decrease a transformation ratio, and thus reduce the cost of parts and decrease the volume of a circuit.

The second converter 140 converts the direct current boosted by the first converter 130 into alternating current according to the control of the control unit 170, and provides the converted alternating current to the filter 150.

In an embodiment, when the direct current boosted by the first converter 130 is transferred to the second converter 140, the second converter 140 may control the pulse width of the direct current according to the control of the control unit 170, and thereby convert the direct current into the alternating current. Such a second converter 140 may be a DC-AC converter.

In order that the alternating current converted by the second converter 140 is converted into alternating current in the form of a sine wave, it is necessary to filter the signal of a preset frequency band.

To this end, the filter 150 filters the signal of the preset frequency band (for example, 300 Hz) when the alternating current is received from the second converter 140.

In an embodiment, the filter 150 may generate the alternating current in the form of a sine wave, by passing a region of the alternating current corresponding to a low frequency and blocking a region of the alternating current corresponding to a high frequency. Such a filter 150 may be a low pass filter.

The current sensor 160 senses the alternating current filtered by the filter 150 and injected into the fuel cell stack 110, and provides the sensed alternating current to the control unit 170.

When the actual alternating current is received from the current sensor 160, the control unit 170 checks whether a difference has occurred between the actual alternating current and injection alternating current, and controls the amplitude of the injection alternating current according to a checking result. The control unit 170 repeatedly performs such a process until a difference does not occur between the actual alternating current and the injection alternating current.

In an embodiment, when the value of the actual alternating current is smaller than the value of the injection alternating current, the control unit 170 may control the second converter 140 to perform a conversion into the alternating current through increasing the amplitude of the injection alternating current. In this way, as the control unit 170 controls the second converter 140 to perform a conversion into the alternating current through increasing the amplitude of the alternating current, the value of the injection alternating current is increased.

In an embodiment, when the value of the actual alternating current is larger than the value of the injection alternating current, the control unit 170 may control the second converter 140 to perform a conversion into the alternating current through decreasing the amplitude of the injection alternating current. In this way, as the control unit 170 controls the second converter 140 to perform a conversion into the alternating current through decreasing the amplitude of the alternating current, the value of the injection alternating current is decreased.

The apparatus 100 for generating injection current for a fuel cell stack may further include a bidirectional converter. When the high voltage battery 120 and the fuel cell stack 110 are connected in parallel, the bidirectional converter converts the voltage of the high voltage battery 120 and provides the converted voltage to the fuel cell stack 110 or converts the voltage of the fuel cell stack 110 and provides the converted voltage to the high voltage battery 120.

In an embodiment, when providing the voltage of the high voltage battery 120 to the fuel cell stack 110, the bidirectional converter may boost the voltage of the high voltage battery 120, and provide the boosted voltage to the fuel cell stack 110.

In an embodiment, if the voltage of the fuel cell stack 110 is raised by regenerative braking, the bidirectional converter may buck the voltage of the fuel cell stack 110, and provide the bucked voltage to the high voltage battery 120.

In this way, by setting the voltage of the high voltage battery 120 to be lower than the voltage of the fuel cell stack 110 and using the bidirectional converter which boosts the voltage of the high voltage battery 120 to the voltage of the fuel cell stack 110, advantages are provided in that the cost of the high voltage battery 120 may be reduced as the number of cells of the high voltage battery 120 is decreased.

Such a high voltage battery 120 always retains a power-on state even though a vehicle is changed to an off state. Accordingly, advantages are provided in that a fault of the fuel cell stack 110 may be diagnosed since the voltage of the fuel cell stack 110 may be measured even before the fuel cell stack 110 generates power.

Meanwhile, a super capacitor may be used instead of the high voltage battery 120 of FIG. 1. In the case where the super capacitor is used, the supper capacitor and the fuel cell stack 110 may be connected in parallel without separately using a bidirectional converter.

Figure 2:
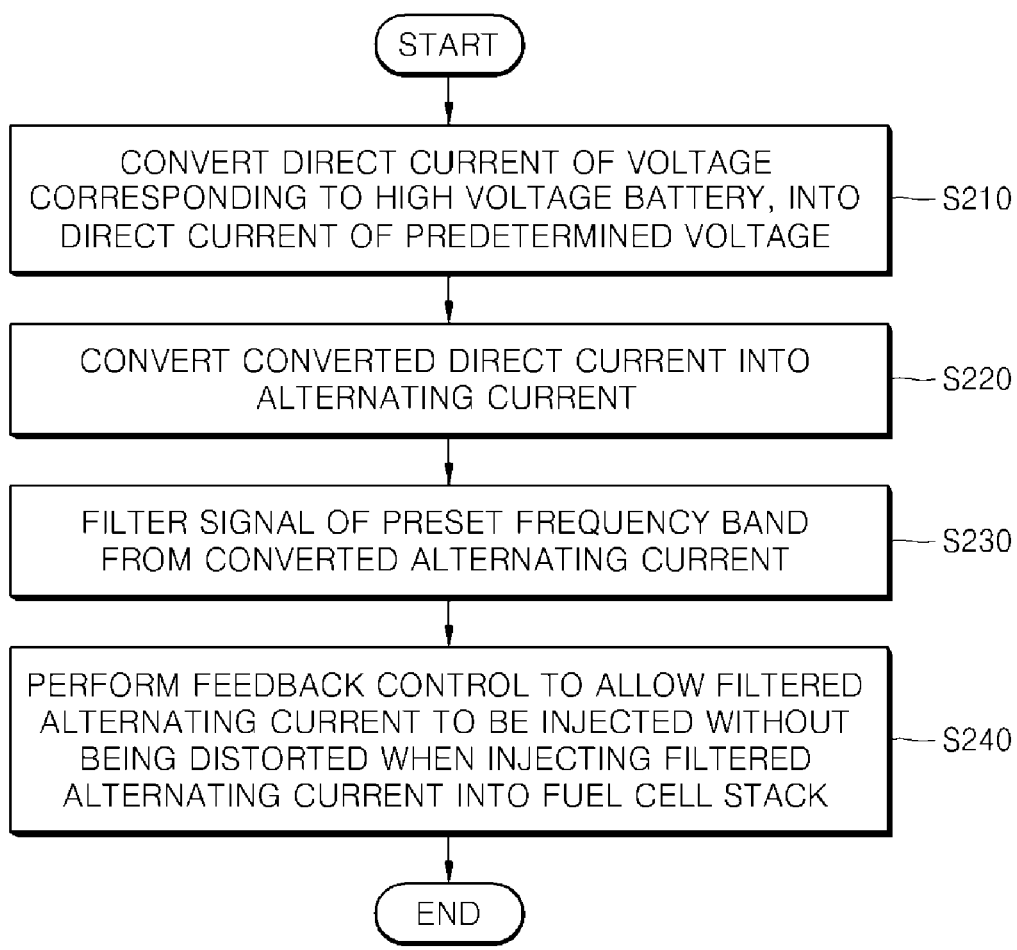
FIG. 2 is a flow chart explaining a method for generating injection current for a fuel cell stack in accordance with an embodiment.

FIG. 2 is a flow chart explaining a method for generating injection current for a fuel cell stack in accordance with an embodiment.

Referring to FIG. 2, the apparatus 100 for generating injection current for a fuel cell stack boosts the direct current of a voltage corresponding to a high voltage battery, and converts the direct current into the direct current of a predetermined voltage (S210).

The apparatus 100 for generating injection current for a fuel cell stack converts the converted direct current into alternating current (S220). In an embodiment of the step S220, the apparatus 100 for generating injection current for a fuel cell stack may convert the direct current into the alternating current by controlling the pulse width of the direct current.

The apparatus 100 for generating injection current for a fuel cell stack filters the signal of a predetermined frequency band from the converted alternating current (S230).

In an embodiment of the step S230, the apparatus 100 for generating injection current for a fuel cell stack may generate alternating current in the form of a sine wave by passing a region of the alternating current corresponding to a low frequency and blocking a region of the alternating current corresponding to a high frequency.

The apparatus 100 for generating injection current for a fuel cell stack performs a feedback control to allow the filtered alternating current to be injected without being distorted when injecting the filtered alternating current into a fuel cell stack (S240).

Figure 3:
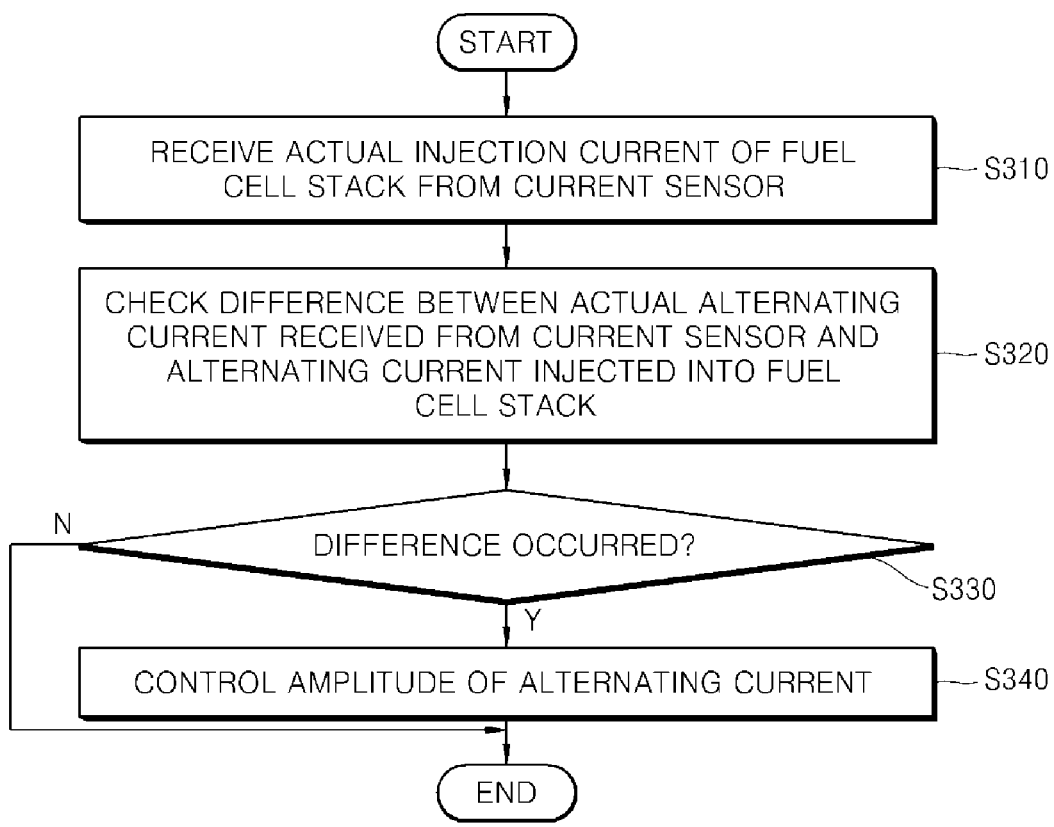
FIG. 3 is a flow chart explaining a method for generating injection current for a fuel cell stack in accordance with an embodiment.
Figure 4:
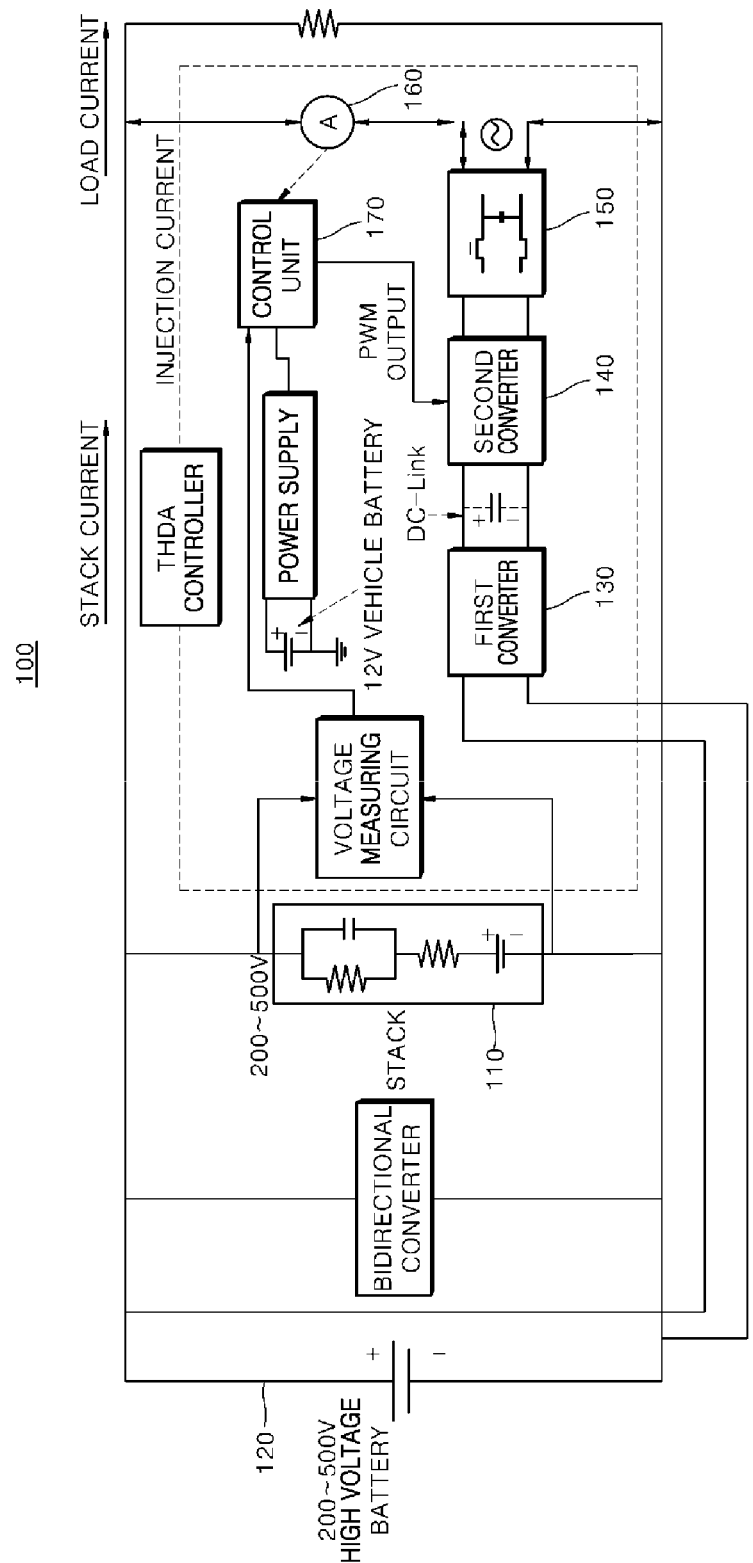
FIG. 4 is a block diagram of an apparatus for generating injection current for a fuel cell stack with a bidirectional converter in accordance with an embodiment.

FIG. 3 is a flow chart explaining a method for generating injection current for a fuel cell stack in accordance with an embodiment.

Referring to FIG. 3, the apparatus 100 for generating injection current for a fuel cell stack receives the actual injection current of a fuel cell stack from a current sensor (S310). The apparatus 100 for generating injection current for a fuel cell stack checks the difference between the actual alternating current received from the current sensor and the alternating current injected into the fuel cell stack (S320). When the difference has occurred between the actual alternating current and the alternating current, as a result of checking (S330), the apparatus 100 for generating injection current for a fuel cell stack controls the amplitude of the alternating current (S340).

As is apparent from the above descriptions, according to the embodiments, a high voltage battery is used instead of a general battery for a vehicle such that it is sufficient to boost only several tens of volts when boosting the direct current of a voltage corresponding to the high voltage battery, whereby it is possible to decrease a transformation ratio, and thus reduce the cost of parts and decrease the volume of a circuit.

Also, according to the embodiments, a fault of a fuel cell stack may be diagnosed by measuring the voltage of the fuel cell stack even before the fuel cell stack generates power, because a high voltage battery always retains a power-on state even though a vehicle is changed to an off state.

Hereinabove, although specific exemplary embodiments of the present invention have been described, various modifications may be made without departing from the scope of the present invention. Accordingly, the scope of the present invention is not construed as being limited to the described exemplary embodiments, but should be defined by the following claims as well as equivalents thereof.

Although the present invention has been described with reference to the exemplary embodiments and the accompanying drawings, it is not limited to the above-mentioned exemplary embodiments, but may be variously modified and altered from the above description by those skilled in the art to which the present invention pertains. Therefore, the scope and spirit of the present invention should be understood only by the following claims, and all of the equivalences and equivalent modifications of the claims should be intended to fall within the scope and spirit of the present invention.

What is claimed is:

1. An apparatus for generating an alternating current for a fuel cell stack in which the fuel cell stack supplies an electrical power required for driving a vehicle, the apparatus comprising:
    a first converter configured to convert direct current of a voltage corresponding to a high voltage battery, into direct current of a predetermined voltage, wherein the voltage of the high voltage battery is higher or lower than a voltage of the fuel cell stack, wherein the high voltage battery is configured to be boosted with tens of volts when boosting the direct current of the voltage corresponding to the high voltage battery;
    a second converter configured to convert the direct current output from the first converter into alternating current;
    a filter configured to filter a signal of a predetermined frequency band from the alternating current output from the second converter to generate a filtered alternating current; and
    a control unit configured to perform feedback control to allow the filtered alternating current output from the filter to be injected into the fuel cell stack without being distorted,
    wherein the high voltage battery retains a power-on state regardless of whether the vehicle is an on slate or an off state so that the high voltage battery provides the direct current of the voltage for generating the filtered alternating current before the fuel cell stack supplies the electrical power required for driving the vehicle.

2. The apparatus according to claim 1, further comprising:
a current sensor configured to detect the filtered alternating current and provide the detected alternating current to the control unit.

3. The apparatus according to claim 2, wherein the control unit checks a difference between the detected alternating current received from the current sensor and the alternating current injected into the fuel cell stack by the control unit.

4. The apparatus according to claim 3, wherein the control unit increases an amplitude of the alternating current injected into the fuel cell stack when a value of the detected alternating current is smaller than a value of the alternating current injected into the fuel cell stack, and
wherein the control unit decreases the amplitude of the alternating current injected into the fuel cell stack when the value of the detected alternating current is larger than the value of the alternating current injected into the fuel cell stack.

5. The apparatus according to claim 1, wherein the high voltage battery is connected in parallel to the fuel cell stack.

6. The apparatus according to claim 5, further comprising:
a bidirectional converter configured to convert the voltage of the high voltage battery and provide a converted voltage to the fuel cell stack, and convert a voltage of the fuel cell stack and provide a converted voltage to the high voltage battery.

7. The apparatus according to claim 1, wherein the first converter boosts the direct current of the voltage corresponding to the high voltage battery, to a voltage larger than the voltage of the fuel cell stack.

8. The apparatus according to claim 1, wherein the second converter converts the direct current output from the first converter into the alternating current output from the second converter by controlling a pulse width of the direct current output from the first converter.

9. The apparatus according to claim 1, wherein the filter generates the filtered alternating current in the form of a sine wave, by passing a region of the alternating current output from the second converter corresponding to lower frequencies and blocking a region of the alternating current output from the second converter corresponding to higher frequencies.

10. A method for generating an injection alternating current for a fuel cell stack in which the fuel cell stack supplies an electrical power required for driving a vehicle, performed in an apparatus for generating the injection alternating current for the fuel cell stack, the method comprising:
converting a direct current of a voltage corresponding to a high voltage battery, into a direct current of a predetermined voltage, wherein the voltage of the high voltage battery is higher or lower than a voltage of the fuel cell stack, wherein the high voltage battery is configured to be boosted with tens of volts when boosting the direct current of the voltage corresponding to the high voltage battery;
converting the direct current of the predetermined voltage into an alternating current;
filtering a signal of a predetermined frequency band from the converted alternating current to generate a filtered alternating current; and
performing feedback control to allow the filtered alternating current to be injected into the fuel cell stack without being distorted,
wherein the high voltage battery retains a power-on state regardless of whether the vehicle is an on state or an off state so that the high voltage battery provides the direct current of the voltage for generating the filtered alternating current before the fuel cell stack supplies the electrical power required for driving the vehicle.

11. The method according to claim 10, further comprising:
receiving, by a control unit, the filtered alternating current detected by a current sensor.

12. The method according to claim 11, wherein the performing of the feedback control to allow the filtered alternating current to be injected into the fuel cell stack without being distorted comprises:
checking whether a difference occurs between the alternating current injected into the fuel cell stack by the control unit and the detected alternating current received by the control unit.

13. The method according to claim 12, wherein the checking of whether the difference occurs between the alternating current injected into the fuel ceil stack and the detected alternating current comprises:
increasing an amplitude of the alternating current injected into the fuel cell stack when a value of the detected alternating current is smaller than a value of the alternating current injected into the fuel cell stack; and
decreasing the amplitude of the alternating current injected into the fuel cell slack when the value of the detected alternating current is larger than the value of the alternating current injected into the fuel cell stack.

14. The method according to claim 10, wherein the high voltage battery is connected in parallel to the fuel cell slack.

15. The method according to claim 14, further comprising:
converting the voltage of the high voltage battery, and providing the converted voltage of the high voltage battery to the fuel cell stack; and
converting a voltage of the fuel cell stack, and providing the converted voltage of the fuel cell stack to the high voltage battery.

16. The method according to claim 10, wherein the converting of the direct current of the voltage corresponding to the high voltage battery into the direct current of the predetermined voltage comprises:
boosting the direct current of the voltage corresponding to the high voltage battery, to a voltage larger than the voltage of the fuel cell stack.

17. The method according to claim 10, wherein the converting of the direct current of the predetermined voltage into the alternating current comprises:
converting the direct current of the predetermined voltage into the alternating current by controlling a pulse width of the converted direct current.

18. The method according to claim 10, wherein the filtering of the signal of the predetermined frequency hand from the converted alternating current to generate the filtered alternating current comprises:
generating the alternating current in the form of a sine wave, by passing a region of the converted alternating current corresponding to lower frequencies and blocking a region of the converted alternating current corresponding to higher frequencies.

* * * * *